United States Patent [19]
Bratzler et al.

[11] 3,931,389
[45] Jan. 6, 1976

[54] PROCESS OF DESULFURIZING HOT GASES

[75] Inventors: Karl Bratzler, Bad Homburg; Alexander Dorges, Frankfurt am Main; Georg Kempf, Schoneck; Paul Rudolph, Bad Homburg; Johann Schlauer, Frankfurt am Main-Goldstein, all of Germany

[73] Assignee: Metallgesellschaft Aktiengesellschaft, Frankfurt am Main, Germany

[22] Filed: Oct. 23, 1974

[21] Appl. No.: 517,343

Related U.S. Application Data

[63] Continuation of Ser. No. 256,057, May 23, 1972, abandoned.

[30] Foreign Application Priority Data
June 4, 1971 Germany............................ 2127763

[52] U.S. Cl. ................................................ 423/232
[51] Int. Cl.² ........................................... B01D 53/34
[58] Field of Search .................... 423/223, 226–229, 423/232, 233

[56] References Cited
UNITED STATES PATENTS

| | | | |
|---|---|---|---|
| 2,607,657 | 8/1952 | Bechtold et al..................... | 423/229 |
| 2,886,405 | 5/1959 | Benson et al. ...................... | 423/232 |
| 3,101,996 | 8/1963 | Bresler et al....................... | 423/229 |
| 3,787,559 | 1/1974 | Rudolph et al. .................... | 423/222 |

Primary Examiner—Earl C. Thomas
Attorney, Agent, or Firm—Burgess, Dinklage & Sprung

[57] ABSTRACT

Gases produced by reacting fuels with oxygen containing gases and water vapor under pressure are desulfurized by scrubbing with a concentrated solution of one or more alkali salts of weak inorganic acids at a temperature near the atmospheric-pressure boiling point of the solution in a column while maintaining an exchange ratio of from 0.2 to 2.0 cubic meters of the concentrated solution per standard cubic meter hydrogen sulfide in the gas to be purified.

8 Claims, 1 Drawing Figure

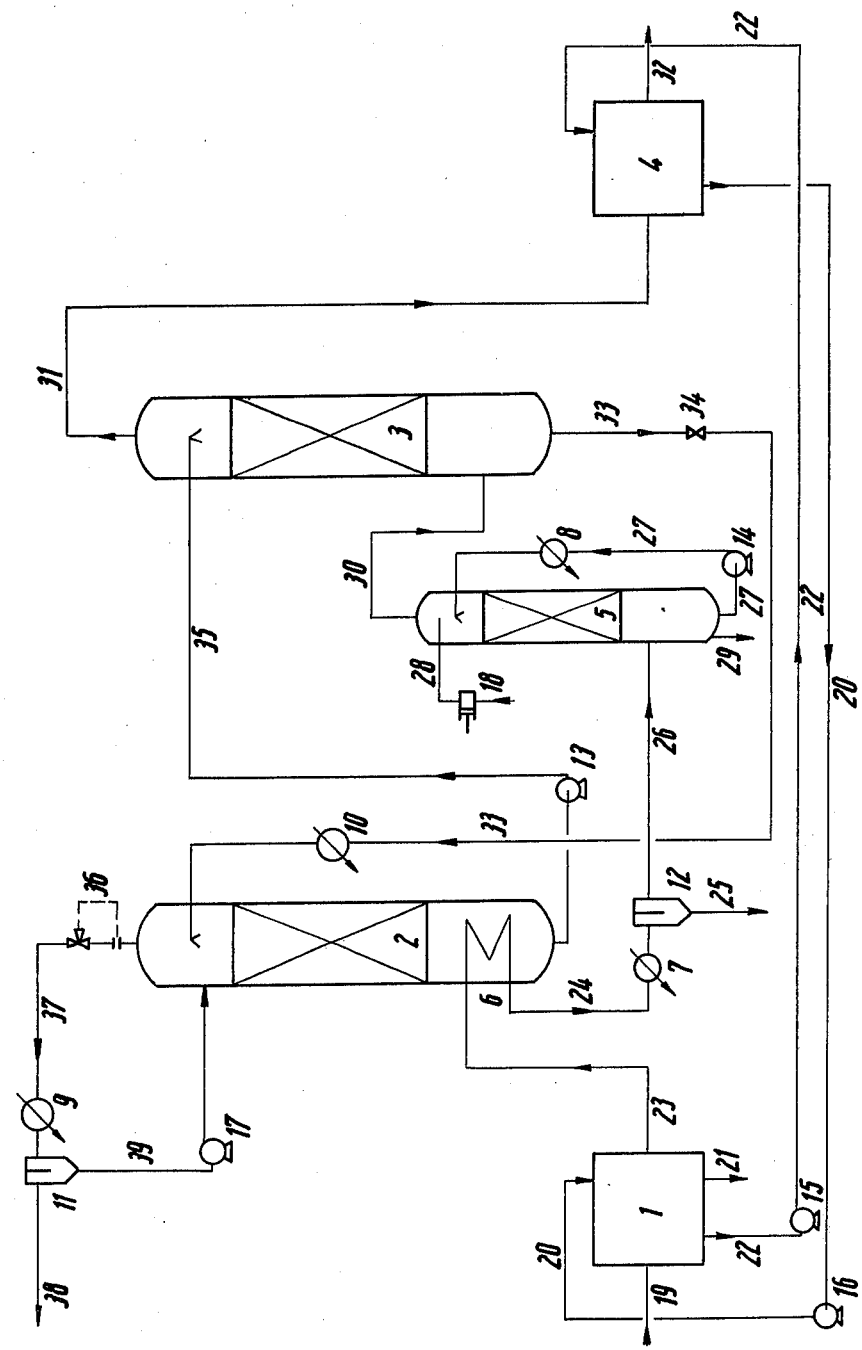

PROCESS OF DESULFURIZING HOT GASES

This is a continuation, of application Ser. No. 256,057, filed May 23, 1972 and now abandoned.

BACKGROUND

The invention relates to a process for selectively desulfurizing gases produced by reacting fuels with oxygen containing gases and water vapor under pressure. More particularly, this invention relates to a process for desulfurizing gases utilizing an alkali salt concentrated scrubbing solution at a certain temperature while maintaining a certain exchange of volume ratio.

Fuel gases which are produced by a gasification of solid or liquid fuels with oxygen, air or mixtures thereof and/or with steam and which are subsequently purified, particularly to remove sulfur compounds, and, if desired, carbon dioxide, must be cooled before such purification from the high temperature of the gasifying reaction, which exceeds 500°C., to a temperature which is suitable for the purification and is below 150°C., preferably to the ambient temperature or below the same, e.g., down to −70°C. This cooling may result in a removal of certain components of the gas and such removal may constitute a loss as far as the subsequent stages are concerned in which the gas is utilized. Such components are, e.g., water vapor, which could be used for a shift conversion of carbon monoxide to form carbon dioxide and hydrogen, or hydrocarbons which are still vaporous at higher temperatures and which would contribute to the caloric value of the purified gas, particularly if the gas which has been produced is utilized as a fuel gas in a gas turbine. A gas for this purpose should be combustible, free of sulfur and as hot as possible. The value of the gas depends more on its volume than on its caloric value. For this reason, the fuel which is available is preferably gasified with air. Such gas may contain water vapor and carbon dioxide as components which are useful because they increase the volume.

Known processes of desulfurizing hot gases use compositions which absorb sulfur compounds and which consist, e.g., of iron oxide or zinc oxide and combine with sulfur to form sulfide. Their use is expensive and requires a gas which has been prepurified to a large extent and particularly is free of water vapor. For this reason, these processes are mainly used for a fine purification of pretreated gases or as a safety measure.

Gases are conventionally purified in scrubbing processes in which the substances to be removed from the gas are taken up by physically or chemically acting absorbent solutions.

In physically acting absorbent solutions, the gas components are dissolved in dependence on their absorption coefficient and their partial pressure. In accordance therewith, the absorption capacity of the physically acting scrubbing solution increases with increasing pressure and decreasing temperature. For this reason, scrubbing processes using physically acting absorbents are carried out under elevated pressures above about 10 kilograms per square centimeter and with high-boiling organic solvents, such as ethylene glycol, diglycol ether, propylene carbonate, N-methylpyrrolidone, at ambient temperature or with low-boiling organic solvents, particularly methanol, at temperatures below −10°C. down to about −70°C.

In chemically acting absorbent solutions, several gas components, particularly those having an acid function, specifically sulfur compounds and carbon dioxide, are chemically combined. Chemical absorbent solutions are generally required to lend themselves to easy regeneration, i.e., to a reversal of the absorption reaction under simple conditions.

Scrubbing processes using chemically acting absorbents are less dependent on pressure. They may be carried out under ambient pressure and at ambient temperature. The laden absorbent solution may be regenerated by boiling and stripping with stream or with the aid of air.

Suitable absorbent solutions are aqueous solutions of strong organic bases or of alkali salts of inorganic or organic acids. The aqueous solutions of weak acids may be used also at higher absorption temperatures, although an elevated pressure must then be applied. In this case, the regeneration is effected by a pressure relief to a lower pressure, preferably to ambient pressure, with boiling and stripping with steam.

U.S. Pat. No. 2,886,405 discloses a process of scrubbing fuel gases and synthesis gases to remove acid components, particularly carbon dixoide. In that process, the absorption is effected in a hot concentrated solution of potassium carbonate at a temperature near the atmospheric-pressure boiling point of the solution, and the laden solution is regenerated by a pressure relief and by boiling and stripping with the steam which is produced in the boiling solution or which is additionally introduced.

That known scrubbing process is particularly suitable for a removal of the large amounts of carbon dioxide which have been formed by shift conversion of carbon monoxide with water vapor to form carbon dioxide and hydrogen in the production of synthesis gases or hydrogen.

That process known as the hot potash scrubbing process may be used to remove sulfur compounds, particularly $H_2S$ together with the carbon dioxide, from the gas to be purified. So far, it has not been possible to accomplish a selective absorption of the sulfur compounds before the absorption of carbon dioxide under the conditions of the hot potash scrubbing process.

SUMMARY

It has been found that such selective absorption of sulfur compounds is possible by maintaining an exchange volume of from about 0.2 to about 2.0 cubic meters of absorbent solution per standard cubic meter of the sulfur compounds to be removed from the gas in the absorption column. This requirement is applicable not only to solutions of potassium carbonate but generally to aqueous solutions of alkali salts of weak inorganic acids, particulary of phosphoric acid, vanadium acid, boric acid, and the like, and particularly to aqueous solutions of mixtures of such salts. It is known that such mixtures of absorbent solutions may be used to increase the exchange rate or to inhibit corrosion (German Pat. No. 1,074,201).

The invention relates to a process of selectively desulfurizing gases which have been produced by a reaction of liquid or solid carbonaceous fuels with oxygen-containing gases and water vapor under pressure, which process comprises scrubbing with aqueous solutions of alkali salts of weak inorganic acids to remove the sulfur compounds and regenerating the laden solution by a pressure relief, heating, and stripping with water vapor.

The process according to the invention is characterized in that the gas is scrubbed with a concentrated solution of one or more alkali salts of weak inorganic acids at a temperature which is near the atmospheric-pressure boiling point of the solution in packed or plate columns while maintaining an exchange volume ratio of from about 0.20 to about 2.0 cubic meters of the solution per standard cubic meter hydrogen sulfide in the gas to be purified.

DESCRIPTION OF THE DRAWING

The present invention will be more fully understood from the following description taken in conjunction with the accompanying drawing which is a flow diagram of a suitable plant for carrying out the process of the invention.

DESCRIPTION

The raw gas is discharged from the gas producer at a temperature above 550°C. and is cooled in the usual manner in waste-heat boilers, scrubber-coolers, soot-removing scrubbers and the like to about 150°–200°C. and subsequently subjected to an indirect cooling to a temperature which is a few degrees below the operating temperature of the absorption tower of the desulfurizing plant. When the resulting condensate has been removed from the gas which has thus been precooled, the gas is heated to the operating temperature of the absorption tower by a direct heat exchange, e.g., in a counterflow column, with a small amount of a hot salt solution, which is additionally heated, and the gas is thus saturated with water vapor at the temperature to which it is heated. In this state the gas can flow through the absorption tower without entraining substantial amounts of water from the absorbent solution and without condensing substantial amounts of water vapor into the absorbent solution.

The substantially desulfurized gas, which is hot and saturated with water vapor, then flows off the top of the absorption column and may be supplied directly into a succeeding hot potash scrubber, in which carbon dioxide is absorbed, and/or into a carbon monoxide shift conversion unit.

In a special embodiment of the invention, the gas may be further heated and enriched with water vapor with utilization of the heat extracted before the desulfurization. The resulting gas is an excellent fuel for a gas turbine.

In accordance with the invention, the gas which has been directly cooled to a temperature between 200° and 150°C. in the conventional manner in a scrubber-cooler or a soot-removing scrubber is indirectly cooled in a plurality of stages to the operating temperature of the desulfurizing plant. The first, hottest cooling stage is an indirect-contact pressure cooler supplied with water. In this cooler, the water is heated to a temperature above that of the desulfurized gas exhausted from the absorption tower. In a trickling tower, the water is then contacted with that gas so that the latter is heated and further enriched with water vapor whereas the water is cooled and partly evaporated. When fresh water has been added to compensate the water which has evaporated, the water is returned into the indirect-contact pressure cooler. The further indirect cooling may be effected in the reboiler of the desorption column. The gas is then cooled to a temperature which is a few degrees below the temperature of the absorption tower in a final cooler, which is supplied, e.g., with fresh water. The condensate formed in all these indirect cooling stages is collected and discharged. Behind the final cooler, a condensate trap is suitably included to minimize the condensate content of the gas which enters the direct heat exchanger which directly precedes the absorption tower. The salt solution which is circulated through this heat exchanger and a reheater heats the gas to the temperature of the absorption column and saturates it with water vapor is suitably a concentrated solution of alkali, alkali carbonate or alkali bicarbonate. This salt solution may absorb from the gas any acid components thereof, such as phenols, fatty acids and the like, which are not expelled during the regeneration of the laden absorbent solution, so that such components do not enter the succeeding hot potash scrubber. The water which is lost in this heat exchanger may be compensated by means of a pressure pump. To prevent an enriching of the non-volatile acids in the salt solution to an upper limit, a small amount of salt solution may be removed from the heat exchanger from time to time or continuously and may be discarded. If the solution has taken up fatty acids or phenols from the raw gas, as is often the case when solid fuels are gasified, this comparatively small amount of salt solution may be introduced into the pressure gasifier together with the coal and may thus be eliminated.

The gas which has thus been pretreated now enters the absorption tower proper. Because the gas is saturated with water vapor and at the temperature of the absorbent solution, the sulfur compounds preferentially are removed by scrubbing under the existing conditions, particularly at the existing exchange volume ratio, whereas substantial amounts of water do not evaporate from or condense into the solution.

The exchange volume ratio (cubic meters of absorbent solution per standard cubic meter of sulfur compounds) is critical because it must ensure a substantial removal of the sulfur compounds from the gas and restrict the removal of $CO_2$. On the other hand, the amount of $CO_2$ which is removed must not be too small so that the solution can be regenerated in such a manner that the residual $H_2S$ content of the regenerated solution is sufficiently low in view of the permissible $H_2S$ content in the scrubbed gas. This ratio should be as low as possible, but still sufficiently high. In view of this requirement, the range of 0.20 – 2.0 cubic meters of solution per standard cubic meter of sulfur compounds is selected. The low value of 0.20 will be used if the gas has a high content of sulfur compounds, approximately 1.5% by volume $H_2S$. If the $H_2S$ content is low, e.g., about 0.12% by volume, the volume ratio should be 2.0.

The desulfurized, hot gas can then be further heated and enriched with water vapor by being contacted with the trickling hot water from the indirect-contact pressure cooler.

The drawing shows by way of example a flow scheme of a plant for carrying out the process according to the invention. The plant consists substantially of an indirect-contact pressure cooler 1, an absorption tower 2, a regenerating tower 3, a saturator 4 and a direct-contact heat exchanger 5.

The hot raw gas flows through a conduit 19 into the indirect-contact pressure cooler 1, in which part of the heat of the gas is delivered to water. Condensate formed by this indirect cooling is discharged through a conduit 21. The next indirect cooling stage for the raw gas is a reboiler 6 at the regenerating tower 2. In that reboiler, another part of the heat content of the gas is used to reboil the laden absorbent solution used in the regenerating tower 2.

Through a conduit 24, the gas flows into another indirect-contact cooler 7, which is supplied with fresh water and in which the gas is cooled to a temperature which is a few degrees below the operating temperature of the absorption tower 3. In an immediately succeeding condensate trap 12, as much as possible of the condensate is removed from the gas. The saturated gas, which is now free of condensate, flows from the condensate trap in a conduit 26 to the direct-contact heat exchanger 5. A hot salt solution is circulated by a pump 14 in a conduit 27 through the heat exchanger 5 and a reheater 8 and is maintained at a temperature which ensures that the gas in the heat exchanger 5 is heated to the operating temperature of the absorbent tower 3 and is saturated with water vapor. In this state, the gas flows in a conduit 30 to the absorption tower 3, in which it is scrubbed with the hot absorbent solution fed via conduit 35. The scrubbed gas which leaves the absorbent tower 3 has been desulfurized but in other respect has not changed in state as it flows in a conduit 31 to the saturator 4, which consists of a trickling tower, in which the gas is contacted with the hotter water from the indirect-contact pressure cooler 1, which is supplied. The water which has been cooled and partly evaporated in the saturator 4 is recycled by a pump 16 through a conduit 20 to the indirect-contact pressure cooler 1. The purified gas which is withdrawn from the saturator 4 through a conduit 32 is at a temperature above the operating temperature of the absorbent solution and correspondingly saturated with water vapor and is supplied to a further use, e.g., to the combustion chamber of a gas turbine or to a carbon monoxide shift conversion unit.

The absorbent solution laden with sulfur compounds is passed from the sump of the absorption tower 3 through a conduit 33 provided with a pressure relief valve 34 to the top of the regenerating tower 2. A reheater 10 may be provided in the conduit 33 to compensate the temperature loss which is due to the pressure relief. The pressure-relieved solution flows in the regenerating tower 2 over plates or packing down to the sump of the column, in which the regeneration temperature is maintained by means of the reboiler 6.

The regenerated solution is recycled from the sump of the tower 2 by means of a pump 13 through a conduit 35 to the top of the absorption tower 3.

Exhaust gas is withdrawn from the top of the regenerating tower 2 through a conduit 37, which includes a pressure-regulating valve 36, and is passed through a cooler 9 and a succeeding condensate trap 11. The collected condensate is water which has evaporated from the absorbent solution and which is recycled to the top of the regenerating tower by means of a pump 17 through the conduit 39 to maintain the concentration of the absorbent constant. Water which has been lost from the absorbent solution may be compensated by an addition of fresh water at this point. An exhaust gas which is rich in sulfur compounds and may be used in the Claus process is obtained from conduit 38.

The invention will be explained more fully in the subsequent examples.

EXAMPLE 1

A gas produced by a gasification of coal under pressure is passed through a scrubber-cooler and discharged from the same at a rate of 180,000 standard cubic meters per hour and a temperature of 161°C. and under a pressure of 21 kilograms per square centimeter (absolute pressure) and is saturated with water vapor. On a dry basis, the gas contains 13.0% by volume $CO_2$, 1.0% by volume $H_2S$, 0.2% $C_nH_m$ (unsaturated hydrocarbons), 15.8% CO, 25.0% $H_2$, 5% $CH_4$, and 40.0% $N_2$. This gas is to be desulfurized in the plant shown in the drawing. The plant consists of the cooler 1, the regenerator 2, the absorber 3, the saturator 4, the prescrubber 5, the reboilers, reheaters and coolers 6 – 10, the traps 11 and 12 and the pumps 13 – 17.

The raw gas supplied in conduit 19 is cooled in the indirect-contact cooler 1 from 161°C. to 137°C. under a pressure of 20.6 kilograms per square centimeter (absolute pressure) with recirculated water at a rate of 760 metric tons per hour. The water is thus heated from 115°C. to 151°C. The residual heat is removed with condensate which is at a temperature of 140°C. and discharged in conduit 21 at a rate of 38.7 metric tons per hour.

The circulating water which has been heated is supplied through the conduit 22 to the saturator 4. The gas is supplied through a conduit 23 to the reboiler 6 at the regenerator 2 and in this reboiler delivers heat to the desulfurizing absorbent solution which is to be regenerated.

The gas leaving the reboiler 6 is at 110°C., under a pressure of 20.2 kilograms per square centimeter (absolute pressure), and saturated with water vapor so that 12.5 million kilocalories per hour are available for the regeneration. Condensate, which contains also tar components, is obtained at a rate of 12.5 metric tons per hour. For this reason, the gas together with the condensate is supplied in the conduit 24 first to an indirect-contact gas cooler 7 and thereafter to the trap 12, in which the gas is cooled to 103°C. and all condensate and tar components are removed therefrom. The condensate and tar components leave the trap 12 through a conduit 25. The gas then flows through conduit 26 into the counterflow column 5, where all chlorides, fatty acids, thiocyanic acid and other deleterious impurities are removed by a contact with a suitably alkaline salt solution, which is circulated by the pump 14 through the conduit 27 and consists, e.g., of a sodium carbonate solution. This prescrubber contains 40 cubic meters of packing and is operated at 105°C., which is slightly above the condensing temperature of the tar components still contained in the gas. This operating temperature is adjusted by means of the steam-heated reheater 8. The small amount of water which is thus evaporated and the alkali which is consumed are compensated by a supply of an about 2% $Na_2CO_3$ solution by a pump 18 through a conduit 28. Partly spent prescrubbing solution may be withdrawn through a conduit 29 when this is required and may be used further in the gas-producing plant.

The thus pretreated gas enters at 105°C. the absorber 3 through conduit 30, where the gas is desulfurized approximately at the same temperature by a contact with the hot, generated, alkaline scrubbing solution. The gas which flows to the saturator 4 through conduit 31 contains 300 ppm $H_2S$. In the saturator 4, the gas is reheated to 149°C. by hot circulating water, which is at 151°C. and supplied from conduit 22 and flows in a countercurrent to the gas. By this treatment, the gas is correspondingly saturated with water vapor, and the circulated water is recooled to 115°C. At this temperature, the circulated water flows back through the conduit 20 to the cooler 1, whereas the water-vapor containing gas which has been desulfurized but is still hot is supplied through the conduit 32 to the gas turbine process.

The scrubbing solution drained from the absorber 3 is supplied through the conduit 33 and the valve 34 with a pressure relief into the regenerator 2, which is operated under a pressure of 1.1 kilograms per square centimeter (at the top) and at a sump temperature of 106°C. The regenerator is filled with 190 cubic meters of packing. The rising steam formed in the reboiler 6 from the solution regenerates the solution to such a degree that it can desulfurize the gas in the absorber 3 to a residual $H_2S$ content of 300 ppm. This will be possible if the solution has a residual content of 0.8 standard cubic meter $H_2S$ per cubic meter of the solution, provided that the bicarbonate content is at least 1.25 kilogram-molecules per cubic meter. This regenerated solution also contains 1.02 kilogram-molecules $K_2CO_3$ per cubic meter and 0.25 kilogram-molecule borax $(Na_2B_4O_7.1\ OH_2O)$ per cubic meter. The solution at 107°C. is supplied at 500 cubic meters per hour by the pump 13 through the conduit 35 to the absorber 3, which contains 110 cubic meters of packing and in which the solution flows in a countercurrent to the gas, from which it absorbs $H_2S$ at a rate of 1750 standard cubic meters per hour and $CO_2$ at a rate of 9450 standard cubic meters per hour. The solution leaves the tower at 115°C. through conduit 33 and returns to the regenerator 2. Before the pressure relief, the solution now contains 4.3 standard cubic meters $H_2S$ per cubic meter as 0.19 kilogram-molecule KHS per cubic meter, also 2.95 kilogram-molecules $KHCO_3$ per cubic meter, 0.08 kilogram-molecules $K_2CO_3$ per cubic meter and 0.25 kilogram-molecule borax per cubic meter. The pressure relief in the valve 34 results in a cooling so that part of the combined $H_2S$ and $CO_2$ are released. To assist the stripping of $H_2S$, the reheater 10 in the conduit 33 may be used to reheat the pressure-relieved solution. $H_2S$, $CO_2$ and water vapor escape from the top of the regenerator 2 through the valve 36 and the conduit 37. The stripping gas is cooled in the cooler 9 and condensate is removed from the gas in the trap 11. The $H_2S$-containing gas is supplied in conduit 38 to a plant for utilization, e.g., to a Claus plant for a recovery of sulfur. The condensate from the trap 11 is recycled by the pump 17 through the conduit 39 to the regenerator.

Under certain circumstances it may be suitable to operate the regenerator 2 under a slight superatmospheric pressure, e.g., of 2 kilograms per square centimeter (absolute pressure) so that the temperature of the regenerated solution and also the temperature in the scrubbing tower 3 are increased, e.g., to 115°C. This may be accomplished by a suitable setting of the valve 36.

EXAMPLE 2

A gas is produced by the gasification of residue oil with oxygen and steam at a rate of 18,000 standard cubic meters per hour and in a plant as shown in the drawing is pretreated as described in Example 1. At a temperature of 105°C. and under a pressure of 20 kilograms per square centimeter (absolute pressure) the gas which is saturated with water vapor enters the absorber 3 through the conduit 30. On a dry basis, the gas has the following composition under standard conditions:

| | |
|---|---|
| CO | 46.6% volume |
| $H_2$ | 46.6% volume |
| $CO_2$ | 5.0% volume |
| $H_2S$ | 0.15% volume |
| COS | 0.001% volume |
| $CH_4+N_2+Ar$ | 1.88% volume. |

The gas is to be desulfurized to a sulfur content not in excess of 100 ppm by volume. For this purpose, the gas is scrubbed in the absorber 3 with 1.85 cubic meters of scrubbing solution per standard cubic meter of $H_2S$, which corresponds to a rate of 50 cubic meters of solution per hour. The regenerated solution enters the absorber at 107°C. through conduit 35 and contains 1.00 kilogram-molecule $K_2CO_3$ per cubic meter, 1.25 kilogram-molecules $KHCO_3$ per cubic meter, 0.25 kilogram-molecule borax per cubic meter, and 0.3 standard cubic meter $H_2S$ per cubic meter as KHS. Under these conditions, a scrubbed gas is obtained which contains 80 ppm $H_2S$ and 2 ppm COS whereas the solution takes up 25.6 standard cubic meters $H_2S$ per hour and 700 standard cubic meters $CO_2$ per hour, which are stripped off in the regenerator 2.

What is claimed is:

1. Process for desulfurizing hot raw gas produced by the gasification of coal with oxygen-containing gases and water vapor under pressure which comprises:
    a. cooling said raw gas in at least two stages, in the last cooling stage before the desulfurizing step, cooling said raw gas by indirect heat exchange to a temperature below the temperature of the desulfurizing step and removing condensate;
    b. in a subsequent stage raising the temperature of the raw gas to the temperature of the desulfurizing step and introducing said raw gas into a desulfurizing stage where it is treated with a hot solution of one or more alkali salts of weak inorganic acids to selectively remove the sulfur compounds from the gas; and
    c. regenerating the laden desulfurizing solution and recycling it to the desulfurizing stage.

2. Process of claim 1 wherein the temperature is raised in said subsequent stage by directly contacting said gas with a recirculated hot aqueous solution of alkali salts of weak inorganic acids, said solution also prescrubbing and saturating said raw gas with water vapor.

3. Process of claim 1 wherein the raw gas is desulfurized at temperatures of about 105° to 115°C.

4. Process of claim 1 wherein said raw gas is precooled to 200°–150°C and subsequently indirectly cooled to a temperature which is a few degrees below the operating temperature of the desulfurizing step, then the temperature of the raw gas is raised in a prescrubbing stage and thereafter desulfurized.

5. Process of claim 2 wherein the hot aqueous solution contains sodium carbonate.

6. Process of claim 1 wherein subsequent indirect cooling is carried out in a plurality of stages and precooling is carried out with water under pressure.

7. Process of claim 6 wherein one subsequent indirect cooling stage involves a heat exchange between the gas and the absorbent solution laden with sulfur compounds prior to regeneration.

8. Process of claim 7 wherein water drained from the first subsequent indirect cooling stage is cooled by a direct contact with the desulfurized gas and is recycled to the first indirect cooling stage.

* * * * *